US011950743B2

United States Patent
Disch et al.

(10) Patent No.: US 11,950,743 B2
(45) Date of Patent: Apr. 9, 2024

(54) DISHWASHER AND METHOD FOR CLEANING WASHWARE IN A DISHWASHER

(71) Applicant: ILLINOIS TOOL WORKS INC., Glenview, IL (US)

(72) Inventors: Harald Disch, Elzach (DE); Björn S. Himmelsbach, Offenburg (DE); Markus Heidt, Kehl (DE); Verena Wiedenhöfer, Rheinau (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 285 days.

(21) Appl. No.: 16/763,612

(22) PCT Filed: Nov. 5, 2018

(86) PCT No.: PCT/US2018/059153
§ 371 (c)(1),
(2) Date: May 13, 2020

(87) PCT Pub. No.: WO2019/099224
PCT Pub. Date: May 23, 2019

(65) Prior Publication Data
US 2020/0281440 A1 Sep. 10, 2020

(30) Foreign Application Priority Data
Nov. 15, 2017 (DE) ..................... 10 2017 126 856.1

(51) Int. Cl.
*A47L 15/42* (2006.01)
*A47L 15/00* (2006.01)
(Continued)

(52) U.S. Cl.
CPC ....... *A47L 15/4295* (2013.01); *A47L 15/0021* (2013.01); *A47L 15/46* (2013.01);
(Continued)

(58) Field of Classification Search
CPC ............. A47L 15/4295; A47L 15/0021; A47L 15/0047; A47L 15/0078; A47L 15/0081;
(Continued)

(56) References Cited

U.S. PATENT DOCUMENTS

2005/0196046 A1* 9/2005 Hudnut ............... A47L 15/4293
382/218
2010/0328450 A1* 12/2010 Wagner ................... D06F 34/18
348/135
(Continued)

FOREIGN PATENT DOCUMENTS

CN 1988839 A 6/2007
CN 101998839 A 3/2011
(Continued)

OTHER PUBLICATIONS

PCT, International Search Report and Written Opinion, International Application No. PCT/US2018/059153; dated Mar. 29, 2019, 13 pages.

*Primary Examiner* — Douglas Lee
(74) *Attorney, Agent, or Firm* — THOMPSON HINE LLP

(57) ABSTRACT

A dishwasher (1), in particular a commercial dishwasher (1), which is in the form of a box-type dishwasher and has a treatment chamber (2) which can be closed and in which washware can be treated in accordance with a predefined or predefinable treatment program, wherein a washware detector apparatus (51) is designed to detect the type of washware to be, wherein the washware detector apparatus (51) has an optical identification system, which is oriented toward the washware to be treated, and an evaluation device, wherein the optical identification system is designed to record at least a portion of the light reflected by the washware to be treated as a reflection image, and wherein the evaluation device is designed to automatically distinguish between different types of washware on the basis of the recorded reflection (Continued)

image, wherein the extent of the reflection provides information about the type of washware.

9 Claims, 10 Drawing Sheets

(51) Int. Cl.
*A47L 15/46* (2006.01)
*G01N 21/25* (2006.01)
*G06T 7/90* (2017.01)

(52) U.S. Cl.
CPC .............. *G01N 21/255* (2013.01); *G06T 7/90* (2017.01); *A47L 2401/04* (2013.01); *G06T 2207/10024* (2013.01)

(58) Field of Classification Search
CPC ............. A47L 15/4229; A47L 15/4234; A47L 15/4285; A47L 15/46; A47L 2401/04; A47L 2401/30; A47L 2401/34; A47L 2501/04; A47L 2501/05; A47L 2501/07; A47L 2501/30; G01N 21/255; G06T 2207/10024; G06T 7/90
See application file for complete search history.

(56) References Cited

U.S. PATENT DOCUMENTS

| | | | |
|---|---|---|---|
| 2011/0017235 | A1 | 1/2011 | Berner |
| 2012/0060875 | A1* | 3/2012 | Fauth ...................... A47L 15/46 |
| | | | 134/56 D |
| 2012/0138092 | A1 | 6/2012 | Ashragzadeh |
| 2015/0101639 | A1* | 4/2015 | Heppner ............. A47L 15/0026 |
| | | | 134/133 |
| 2018/0214001 | A1* | 8/2018 | Wöbkemeier ....... A47L 15/4295 |
| 2019/0239716 | A1* | 8/2019 | Choi ................... A47L 15/4295 |

FOREIGN PATENT DOCUMENTS

| | | |
|---|---|---|
| CN | 102215985 A | 10/2011 |
| DE | 100 48 081 A1 | 4/2002 |
| DE | 102009023252 | 12/2010 |
| EP | 1738677 A2 | 1/2007 |
| WO | WO 2006/015934 | 2/2006 |
| WO | WO 2011/048575 | 4/2011 |
| WO | WO 2015/194760 | 12/2015 |

* cited by examiner

DISHWASHER AND METHOD FOR CLEANING WASHWARE IN A DISHWASHER

TECHNICAL FIELD

The present invention relates to a dishwasher, in particular commercial dishwasher, which is in the form of a box-type dishwasher and has a treatment chamber which can be closed and in which washware can be treated in accordance with a predefined or predefinable treatment program. The dishwasher according to the invention is preferably embodied as a hood-type dishwasher.

The invention further relates to a method for cleaning washware in a dishwasher, in particular in a commercial dishwasher, which is in the form of a box-type dishwasher and has a treatment chamber which can be closed and in which washware can be treated in accordance with a predefined or predefinable treatment program.

BACKGROUND

Box-type dishwashers are dishwashers which can be manually loaded and unloaded. The box-type dishwashers (box-type warewasher or also called batch dishwashers) may be rack conveyor dishwashers, also called hood-type dishwashers (hood-type warewashers) or front-loader dishwashers (front-loader warewashers). Front-loader dishwashers may be under-counter machines, top-counter machines or free-standing front-loader dishwashers.

Washware includes, for example, plates, cups, pots, trays, cutlery, items of cutlery, glasses and kitchen utensils.

The publication EP 1 738 677 A2 discloses a domestic dishwasher which is designed for the following method sequence: a washing phase, during which washing liquid is sprayed by means of a pump out of a sump via spray nozzles into a washing chamber which is designed for receiving washware. Thereafter, washing liquid is pumped away and the sump is filled with fresh water which is then conveyed by the same pump as that which previously conveyed the washing liquid to the same spray nozzles as the washing liquid. At the transition from the sump to the pump, there is a heater for heating the washing liquid, wherein, during the final rinse phase, the final rinse liquid can be heated or left unheated. The final rinse phase is followed by a steam phase in which fresh water is evaporated out of the sump by means of the heater and is conducted via said spray nozzles into the treatment chamber. The steam phase may be followed by a drying phase in which the heated washware is dried.

Commercial dishwashers require water, detergent, rinse aid and energy for cleaning washware. The consumption of detergent and rinse aid is proportionally dependent on the water consumption per washing cycle. In the case of a constant water inflow temperature, this also applies to the heating energy which is required for heating the final rinse water.

A commercial dishwasher generally has two water circuits which are completely separate from one another. Said water circuits are a water circuit which is responsible for washing and through which used water from the washing tank is routed and a fresh water circuit which is responsible for final rinsing and uses fresh water from a boiler.

The main task of the final rinse phase is to remove the washing liquid residues (lye) from the washware. The final rinse liquid (pure fresh water or fresh water mixed with rinse aid) which is sprayed during the final rinse phase flows into the washing tank and therefore also serves for regenerating the washing liquid. Before new final rinse liquid is conducted into the washing tank during the final rinse phase, the same quantity of washing liquid is pumped away out of the washing tank.

In dishwashers which are designed in the form of a box-type dishwasher, the washware to be treated, such as dishes, pots, glasses, cutlery and other utensils to be cleaned for example, are treated during a plurality of treatment phases which are to be executed in succession, such as a washing phase or washing phases, a final rinse phase or final rinse phases and a drying phase or drying phases for example.

However, different types of washware require different treatment parameters for the individual process steps because of their use, their degree of soiling, their shape and because of the material. In present-day dishwashers which are in the form of a box-type dishwasher, however, automatic differentiation of the types of washware to be treated is generally not carried out, and therefore the conventional programs are often designed to be a compromise such that they can be used for a plurality of different types of washware.

It is known that the box-type dishwashers known from the prior art, such as under-counter dishwashers or hood-type dishwashers for example, can be equipped with a plurality of programs. The individual programs differ from one another mainly in respect of the length of running time (cycle duration) of the treatment phases or—in the case of special programs particularly for treating drinking glasses—in the temperature parameters of the washing phase and of the final rinse phase.

In box-type dishwashers of this kind, the operating personnel have the option of selecting a shorter program, for example for lightly soiled washware, such as for drinking glasses for example, and a longer program for more heavily or heavily soiled washware.

In practice, however, because of inadequate training of the operating personnel in particular, the option of manual program selection is utilized only rarely, and therefore a program which is preset at the factory is mainly employed for treating the washware, irrespective of the type of washware.

If, during treatment of the washware, a program which is preset at the factory is employed which is generally designed to be a compromise such that it can be used more or less efficiently for a plurality of types of washware, for example, lightly soiled tableware, such as drinking glasses for example, is washed for an uneconomically long time and at higher temperatures than would actually be required. On the other hand, there is the risk that, for example, washware with food residues which are relatively difficult to remove, such as cooking utensils and/or cutlery for example, are not cleaned sufficiently, and therefore, under certain circumstances, a plurality of washing runs or additional manual cleaning operations are necessary.

For this reason, dishwashers generally provide the operator with the option of switching between different program sequences or program cycles. These are specially optimized for dedicated types of washware. They differ in respect of temperature, quantity of final rinse water, water pressure, cycle time and the quantity of chemicals employed in order to minimize manual pre- and post-treatment of the washware outside the dishwasher.

However, it has been found that, in practice, many operators do not actually make use of the option of manually adjusting or switching the treatment program depending on the type of washware. This has the disadvantage that efficient utilization of the resources (fresh water, chemicals and energy) during operation of the dishwashers is often not possible and, respectively, that good treatment results cannot be provided for all types of washware. As a consequence of this, it is necessary to manually pre- and post-treat the washware, this resulting in more time being spent in the scullery.

SUMMARY

Proceeding from the above problem, the present invention is therefore based on the object of optimizing a dishwasher of the kind mentioned in the introductory part such that optimum treatment results can be provided automatically for all types of washware, wherein the resources (fresh water, chemicals and energy) can be utilized as efficiently as possible at the same time. A further aim is to achieve the object of specifying a corresponding method for operating a dishwasher of this kind, which is in the form of a box-type dishwasher in particular, and, respectively, for cleaning washware in a dishwasher.

This object is achieved by the subject matter of independent patent claim 1 in respect of the dishwasher and by the subject matter of coordinate patent claim 4 in respect of the method, wherein advantageous developments of the invention are specified in the corresponding dependent claims.

The solution according to the invention is distinguished in that, before the actual treatment (cleaning) of the washware, first the type of washware to be treated is detected with the aid of a suitable washware detector apparatus and a predefined or predefinable treatment program for treating the washware is automatically selected by a program control device depending on the detected type of washware. Subsequently, automatic setting of the process parameters which are associated with the selected treatment program takes place.

Firstly, automatic detection of the type of washware to be treated is possible owing to the provision of the washware detector apparatus. Secondly, with the aid of the program control device, an optimum treatment program for treating the washware during at least one treatment phase is selected automatically for each detected type of washware and the process parameters which are associated with the selected treatment program are adjusted. The selection and automatic adjustment of the process parameters preferably take place for at least one treatment phase (washing phase, final rinse phase, drying phase). Since, in this way, the process parameters applicable to the respective treatment phases can be matched to the type of washware to be treated, the consumption of fresh water, chemicals and energy can be optimized.

It is conceivable, in principle, that the program control device is designed to likewise assign each detected type of washware to a predefined or predefinable washware group preferably before actual treatment of the washware. There should advantageously, in turn, be a predefined or predefinable treatment program for each washware group, according to which treatment program the washware of the type of washware assigned to this washware group is to be treated during at least one of the treatment phases, such as during the washing phase, the final rinse phase and/or the drying phase for example.

The treatment program predefined or predefinable for each washware group is preferably a treatment program which firstly is adapted in respect of the consumption of fresh water, chemicals and energy and, secondly, in respect of an adequate cleaning result. The solution according to the invention accordingly renders it possible for the process parameters of the dishwasher to be automatically optimally matched to the respective type of washware to be treated, without the operating personnel having to take action and manually make a program selection.

In the present context, "type of washware" is understood to mean the type of washware to be treated or to be cleaned. The type of washware depends in particular, for example, on the size, the shape and/or the material of the washware to be cleaned.

In order to render possible automatic detection of the type of washware without faults as far as possible, provision is made according to the invention for the washware detector apparatus to have an optical identification system, which is oriented toward the washware to be treated, and a corresponding evaluation device. The optical identification system is designed to record at least a portion of the light reflected by the washware to be treated as a reflection image, wherein the evaluation device is designed to distinguish between different types of washware on the basis of the recorded reflection image, wherein here the extent or the degree of the reflection provides information about the type of washware.

In a development of the dishwasher according to the invention, provision is made in this context for the optical identification system to further be designed to record the color of the light reflected by the washware to be treated, wherein the evaluation device is further designed to distinguish between different types of washware on the basis of the recorded color.

In respect of the optical identification system, it has proven advantageous in particular for said optical identification system to have a camera which is preferably arranged within the treatment chamber and in particular in or in the vicinity of an upper corner region on the rear or front side of the treatment chamber. The optical identification system preferably further has a lighting system with at least one light source which is designed to allow, in particular, homogeneous and preferably diffuse illumination of at least a portion of the washware to be treated, preferably with light at a color temperature of between 5200 and 5700 K.

Mounting a camera within the dishwasher or within the treatment chamber of the dishwasher has critical advantages over a camera position outside the dishwasher. Although external mounting would be ideal for the purpose of protecting the camera, it is relatively difficult to find the right time to record the data/image if the camera is externally mounted. A further disadvantage is the increased expenditure on training the service personnel and the increasing time required for starting-up the dishwasher.

If, in contrast, the camera of the optical identification system is positioned within the treatment chamber, the time for recording the image can be defined relatively easily. This could be done directly when closing the dishwasher or after completion of a prewash. The prewash is a process step in which the washware is preprocessed before the actual program sequence. This would have the advantage that coarse soiling is already removed at the time at which the data/image is recorded. As a result, the image evaluation is considerably more robust. In addition, start-up of the dishwasher at the site of use is not influenced. The camera of the optical identification system can already be fully mounted at the factory, as a result of which firstly expenditure on training the service personnel is not increased and secondly the operator of the dishwasher does not have to put up with relatively long start-up. A further major advantage to be mentioned is the independence of the ambient lighting when mounting the camera within the treatment chamber of the dishwasher. The lighting can be designed such that firmly defined ambient conditions always prevail. This is particularly important in the present case since, according to embodiments of the present invention, colors are also used in the subsequent image evaluation.

If the camera of the optical identification system is positioned within the treatment chamber of the dishwasher, it is advantageous for the camera to be arranged in or in the vicinity of an upper corner region in the rear or front wall of the treatment chamber in order to prevent a reduction in the loading height owing to a centrally arranged camera, to minimize the risk of damage when loading and unloading washware into/from the treatment chamber and in order to effectively prevent the wash arm, which is likewise present in the treatment chamber, from appearing in the image recorded by the camera, irrespective of the position of said wash arm.

In respect of the lighting system which is preferably provided, it should be noted that said lighting system should be designed in order to produce lighting which is as diffuse as possible, so that recordings which exhibit as little reflection as possible can be realized using the camera of the optical identification system. In one possible implementation, a large number of light-emitting diodes can be used as the lighting system, wherein these light-emitting diodes are intended to emit light at a color temperature of preferably between 5200 to 5700 K and in particular light at a color temperature of approximately 5500 K. The color perception at this color temperature comes closest to human color perception. The different shades can be separated from one another most effectively in this case and should therefore also be used in image processing systems in which the color is used as a criterion.

BRIEF DESCRIPTION OF THE DRAWINGS

The invention is described in more detail below using exemplary embodiments with reference to the drawings in which.

DETAILED DESCRIPTION

Figure 1:
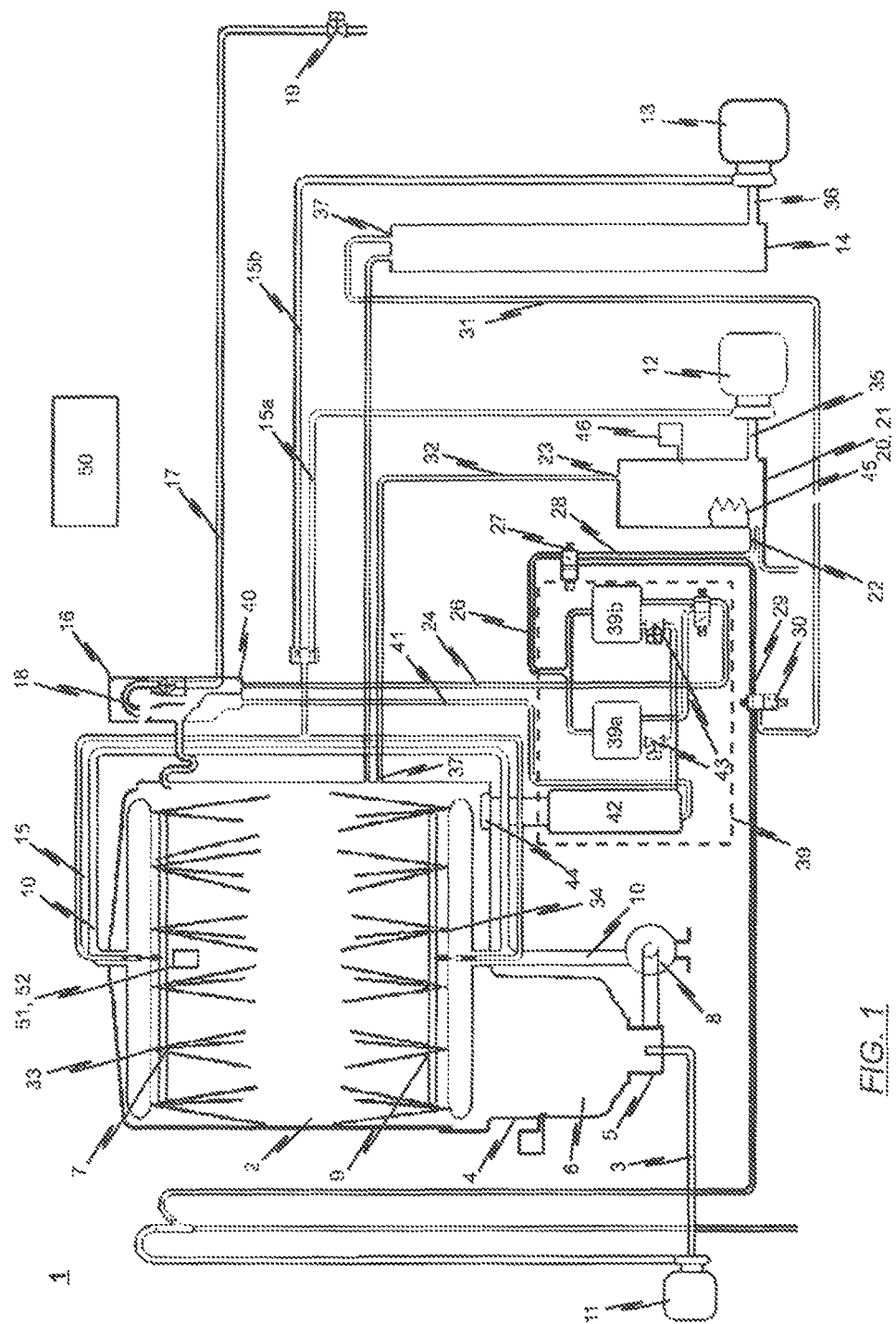
FIG. 1 schematically shows a dishwasher, which is designed in the form of a box-type dishwasher, according to a first embodiment of the invention.

The dishwasher 1 according to the invention has a treatment chamber 2 for cleaning washware, not illustrated in the drawings. A washing tank 4 in which liquid can flow back out of the wash chamber 2 due to the force of gravity is arranged beneath the treatment chamber 2. The washing tank 4 can be covered at the transition to the treatment chamber 2 with the aid of a screen, not illustrated in the drawings. The washing tank 4 contains washing liquid 6 which is usually water to which, if appropriate, detergent can be supplied automatically in a controlled manner by a detergent metering device, not illustrated in the drawings. The washing liquid 6 can be conveyed by a washing pump 8 via a washing line system 10 to washing nozzles 33 and 34 and can be sprayed through these washing nozzles 33, 34 in the treatment chamber 2 onto the washware to be cleaned. The sprayed washing liquid 6 subsequently flows back into the washing tank 4. The lower end 5 of the washing tank 4 can have connected to it a discharge line 3 with an outflow pump 11 in order to empty the washing tank 4 as required.

In the embodiment, illustrated in FIG. 1, of the dishwasher 1 according to the invention, a first final rinse pump 12 is connected by way of its intake side to an outlet 35 of a boiler 21. Furthermore, the boiler 21 has an inlet 22 which is connected to a fresh water feed line 28 and via which either fresh water or fresh water with rinse aid which is added in a metered manner is supplied to the boiler 21. In the boiler 21, the liquid (pure fresh water or fresh water with rinse aid which is added in a metered manner) which is supplied via the inlet 22 is heated according to a stipulated process sequence. Via the first final rinse pump 12 which is connected by way of its intake side to the boiler outlet 35, the final rinse liquid which is heated in the boiler 21 can be supplied, for example during a fresh water final rinse phase, to final rinse nozzles 7 and 9 via a final rinse line system 15, 15a. The final rinse nozzles 7 and 9 are arranged in the treatment chamber 2 in order to spray the final rinse liquid which is heated in the boiler 21 onto the washware in the treatment chamber 2. It is, of course, also conceivable, however, for the boiler 21 to be supplied via the inlet 22 and the fresh water feed line 28 with pure fresh water to which, after heating in the boiler 21, rinse aid is added in a metered manner with the aid of a rinse aid metering device, not illustrated in the drawings.

In the embodiment, illustrated in FIG. 1, of the dishwasher 1 according to the invention, a second final rinse pump 13 is furthermore provided which is connected by way of its intake side to a fresh water container 14 and by way of its delivery side to a final rinse line system 15, 15b. The final rinse line system 15b extending from the delivery side of the second final rinse pump 13 and the final rinse line system 15a extending from the delivery side of the first final rinse pump 12 merge to form a common final rinse line system 15. By means of the second final rinse pump 13 which is connected to the fresh water container 14, unheated final rinse liquid can be conveyed to the final rinse nozzles 7 and 9 which are arranged in the treatment chamber 2 in order to spray unheated final rinse liquid onto the washware as required.

The fresh water container 14 has an inlet 37 which is connected to a fresh water feed line 31. Either pure fresh water or fresh water with rinse aid which is added in a metered manner is supplied to the fresh water container 14 via said fresh water feed line 31.

However, it is, of course, also conceivable to arrange the abovementioned rinse aid metering device, not illustrated explicitly in the drawings, downstream of the outlet 36 of the fresh water container 14.

The washing nozzles 33, 34 and final rinse nozzles 7, 9 are in each case preferably arranged above and below the washware region and are directed toward the washware region of the treatment chamber 2. In the embodiment, illustrated in FIG. 1, of the dishwasher 1 according to the invention, an upper washing nozzle system and an upper final rinse nozzle system, which is embodied separately from said upper washing nozzle system, and also a lower washing nozzle system and a lower final rinse nozzle system, which is embodied separately from said lower washing nozzle system, are provided. However, it would, of course, also be conceivable to provide an upper and a lower washing-nozzle system which serve jointly for spraying washing liquid and for spraying final rinse liquid. The washing nozzles 33, 34 and/or the final rinse nozzles 7, 9 can also be arranged only at the top or only at the bottom, instead of at the bottom and at the top, or, instead or in addition, can also be arranged on one side of the treatment chamber 2 and can be directed into the washware region transversely with respect to the treatment chamber 2.

In the embodiment, illustrated in FIG. 1, of the dishwasher 1 according to the invention, both the boiler 21 and the fresh water container 14 are connected to a non-return device 16 via fresh water feed lines 24, 26, 28, 29 and 31. The non-return device 16 serves to prevent a situation where fresh water can be sucked back from the intake side of the first final rinse pump 12 and/or the intake side of the second final rinse pump 13 into a fresh water feed line 17.

The non-return device 16 has an outlet 40 which is connected to a water softener device 39 via fresh water feed lines 24 and 41. The water softener device 39 has, firstly, a salt container 42 which is connected to the fresh water feed line 41 and, secondly, first and second water softeners 39a, 39b which are arranged parallel to one another. The two water softeners 39a, 39b which are arranged parallel to one another are connected to the outlet 40 of the non-return device 16 via a corresponding fresh water line system and the fresh water feed line 24. The water softeners 39a, 39b of the water softener device 39 can be operated alternately by suitable actuation of valves 43, in order to soften the fresh water which is supplied to the boiler 21 via the fresh water feed lines 26 and 28 and the fresh water supplied to the fresh water container 14 via the fresh water feed lines 26, 29 and 31.

The salt container 42 which forms part of the water softener device 39 can contain a suitable salt or a suitable chemical. The salt or chemical serves, as required, for regenerating a water softener agent which is added in a metered manner to the fresh water or a decomposition product which is produced after the metered addition. The salt container 42 can be refilled with the salt or the chemical from the treatment chamber 2 of the dishwasher 1 via an opening which can be closed by way of a lid 44.

In the illustrated preferred embodiment of the dishwasher 1 according to the invention, the boiler 21 has an integrated steam generator 20. A corresponding steam outlet 23 of the steam generator 20 is formed at the upper region of the boiler 21. The steam outlet 23 of the steam generator 20 is connected via a steam line 32, at a point 37 located above the washing tank 4, to the treatment chamber 2, in order, as required, to introduce the steam which is generated in the steam generator 20 into said treatment chamber. The outlet opening of the steam line 32 is preferably located between the upper nozzles 7, 33 and the lower nozzles 9, 34 of the washing line system 10 or of the final rinse line system 15. However, other positions are, of course, also possible.

A heater 45 is located in the boiler 21 which serves not only for heating the final rinse liquid, but also for generating steam. Furthermore, a level sensor 46, which, for example, controls a valve 19 of the fresh-water line 17, may be arranged in or on the boiler.

In the preferred embodiment, illustrated in FIG. 1, of the dishwasher 1 according to the invention, the provision of the fresh water container 14 and of the second final rinse pump 13 renders it selectively possible to also supply unheated final rinse liquid to the final rinse nozzles 7 and 9 via the final rinse line system 15b and, respectively, 15. It is therefore possible to selectively supply unheated or heated final rinse liquid to the treatment chamber 2 by suitable actuation of, for example, the final rinse pumps 12, 13 and/or by suitable actuation of, for example, the valves 19, 27 and 30 which are arranged in the fresh water feed lines to the fresh water container 14 and to the boiler 21.

A program control device 50, illustrated merely schematically in the drawings, serves for controlling at least one cleaning program and is designed and connected to the controllable components of the dishwasher 1, such as, for example, to the valves 19, 27 and 30, to the washing pump 8, to the first final rinse pump 12, to the second final rinse pump 13 and/or to a heater control circuit (not explicitly illustrated) for controlling the heater 45, in order to implement a cleaning method (cleaning cycle) comprising the following steps (phases) which are to be carried out in succession:

1. a washing phase, in which washing liquid 6 is sprayed out of the washing tank 4 through the washing line system 10 into the treatment chamber 2 by means of the washing pump 8 and can then flow back from the treatment chamber 2 into the washing tank 4 due to the force of gravity;
2. a fresh water final rinse phase, in which heated or unheated fresh water or fresh water to which rinse aid has been added in a metered manner is sprayed as final rinse liquid into the treatment chamber 2 by means of the first final rinse pump 12 or the second final rinse pump 13 and can then flow from the treatment chamber 2 into the washing tank 4 due to the force of gravity; and
3. (optionally) a drying phase, in which drying air circulates within the treatment chamber 2.

In a preferred implementation of the program control device 50, said program control device is designed in such a way that it automatically activates the controllable components of the dishwasher 1 as a function of the detected type of washware, such that, after the fresh water final rinse phase, a steam final rinse phase is carried out, in which steam is generated by means of the steam generator 20 which is connected to the fresh water feed line 28 and is conducted into the treatment chamber 2.

The dishwasher 1 according to the invention—as illustrated, for example, in FIG. 1—is distinguished, inter alia, in that a washware detector apparatus 51, indicated merely schematically in the drawings, is provided and serves for detecting the type of washware received in the treatment chamber 2. The washware detector apparatus 51 is preferably arranged inside or outside the treatment chamber 2 in such a way that either the washware received in the treatment chamber 2 or a washware rack which is inserted into the treatment chamber 2 enters the detection region of said washware detector apparatus. The term "washware detector apparatus" used herein is to be understood to mean any detection apparatus which is designed for directly or indirectly detecting or determining the type of washware.

As an alternative or in addition to this, it is conceivable that the washware detector apparatus 51 has at least one detector device 52 by way of which the type of washware can be detected indirectly. This implementation is particularly suitable when the dishwasher 1 is designed in such a way that at least one washware rack (not explicitly illustrated in the drawings), which receives the washware to be treated, can be inserted into the treatment chamber 2 of the dishwasher 1. In this case, the washware to be treated should preferably be sorted according to types of washware in such a way that only washware of a single type is inserted into each washware rack. In this case, provision is preferably made for each washware rack to have an identification feature, such as an identification code for example, which can be detected by the detector device 52. The identification feature which is detected by the detector device 52 then provides information on the type of washware which is received by the washware rack.

On the other hand, however, it is also conceivable that the detector device 52 is designed to detect the size and/or type of the at least one washware rack which can be received in the treatment chamber 2 of the dishwasher 1 and, on the basis of this information, to draw a conclusion as to the type of washware which is received by the washware rack. In one possible implementation, provision may be made, for example, for the following sorting operation to be performed before the actual treatment of the washware in the dishwasher:

- plates which are manufactured from porcelain or a porcelain-like material are inserted into a washware rack which is designed as a plate rack;
- cooking utensils which are manufactured from a metal, in particular from stainless steel, are inserted into a washware rack which is designed as a flat rack;
- cutlery or items of cutlery which are manufactured from metal, in particular from stainless steel, is/are inserted into a washware rack which is designed as a cutlery rack; and
- drinking glasses which are manufactured from glass or a glass-like material are inserted into a washware rack which is designed as a glass rack.

The remaining types of washware can in this case be inserted, for example, into a washware rack which is designed as a plate rack. When a presorting operation of this kind is performed, it is conceivable, in one possible implementation of the washware detector apparatus 51, that said washware detector apparatus has a detector device 52 which is designed, for example, for detecting the type of washware rack (plate rack, flat rack, cutlery rack, glass rack, etc.) which is inserted or to be inserted into the treatment chamber 2 and thereby to indirectly determine the type of washware which is inserted into the treatment chamber 2 of the dishwasher 1. The type of washware rack can be detected, for example, optically by way of the size, height and/or by way of the shape with the aid of the detector device 52. However, in this case, detection of another suitable identification feature of the washware rack may, of course, also be considered.

As already mentioned, in the dishwasher 1 according to the present invention, the program control device 50, which is illustrated merely schematically in the drawings, is also provided. According to the invention, the program control device 50 is designed to actuate different actuable components of the dishwasher 1, such as, for example, the respective pumps and valves, in accordance with a predefined or predefinable program sequence in order to thereby be able to adjust suitable process parameters during the individual treatment phases (washing phase, final rinse phase and drying phase). The program control device 50 is connected, in particular via a suitable communication link, to the washware detector apparatus 51 in order to continuously or at predetermined times or events, preferably before the start of the washing cycle, check the type, detected by the washware detector apparatus 51, of washware received in the treatment chamber 2 of the dishwasher 1.

The program control device 50 is designed, on the basis of the type of washware which is detected by the washware detector apparatus, to automatically identify the washware to be treated. The program control device 50 can preferably automatically identify at least the following washware:

- plates which are manufactured from porcelain or a porcelain-like material;
- cups which are manufactured from porcelain or a porcelain-like material, glass or a glass-like material;
- bowls which are manufactured from porcelain or a porcelain-like material, glass or a glass-like material;
- trays or tray-like articles which are manufactured from a plastic material;
- containers, in particular food-grade containers, which are manufactured from a metal, in particular from stainless steel;
- pots which are manufactured from a metal, in particular from stainless steel;
- pans which are manufactured from a metal, in particular from stainless steel;
- cutlery and items of cutlery which is/are manufactured from a metal, in particular from stainless steel; and
- drinking glasses which are manufactured from glass or a glass-like material.

In the event that the program control device 50 does not identify the washware on the basis of the detected type of washware, the washware in question is identified as "other washware".

The solution according to the invention is distinguished not only, firstly, by the automatic detection of the type of washware to be treated and, secondly, by the automatic identification of the washware to be treated, but also by the additional functionality of the program control device 50, whereby said program control device is designed to automatically select, as a function of the detected type of washware, a predefined or predefinable treatment program according to which the washware which is received in the treatment chamber 2 is to be treated during at least one treatment phase, and for adjusting the process parameters of the selected treatment program by corresponding actuation of the actuable components of the dishwasher 1. For this purpose, it is conceivable in principle for the program control device 50 to have, for example, a storage device, not explicitly illustrated in FIG. 1, to which the program control device 50 can have access. In each case optimally adapted treatment programs or corresponding process parameters for operating the dishwasher 1 are stored in said storage device for the individual types of washware which come into question.

The invention is based, amongst other things, on the knowledge that the process parameters which are optimal for the individual treatment phases are dependent on the type of washware to be treated. The different types of washware require suitable treatment programs according to which the washware is to be treated, for example, during the washing phase, the fresh water final rinse phase and/or the drying phase. Therefore, for example, only lightly soiled items of tableware, such as, for example, drinking glasses, in contrast to heavily soiled items of cookware with burnt-on food residues which are difficult to remove, such as, for example, cooking utensils, keeping-warm containers, baking molds, etc., require, during the washing phase, only a relatively small quantity of washing liquid sprayed per unit time and only a relatively low nozzle pressure with which the washing liquid is sprayed. Furthermore—in comparison with heavily soiled items of cookware—only a shorter cycle duration of the washing phase is necessary for lightly soiled items of tableware.

On the other hand, the different types of washware also require coordinated treatment programs for the fresh water final rinse phase which follows after the washing phase. Adaptation, carried out in terms of the type of washware, of the process parameters for the steam final rinse phase and drying phase, which are to be carried out, if appropriate, after the fresh water final rinse phase, is also likewise conceivable.

As a result, "overtreatment", in particular of only lightly soiled items of tableware, such as, for example, drinking glasses, can be efficiently prevented in a simple, but effective, way, so that no more resources in terms of energy, water, chemicals, etc. than are necessary are used during the cleaning process (and, if appropriate, during the drying process) for only lightly soiled items of tableware of this kind.

The consumption of fresh water, which is sprayed in pure form or mixed with further additives onto the washware, for example, during the fresh water final rinse phase, can also be reduced. As a result of the reduced consumption of fresh water by the dishwasher 1, the consumption of chemicals, in particular rinse aids and/or detergents, can also be reduced, without there being a change in the concentration of chemicals in the respective liquid (washing liquid, final rinse liquid). Owing to a lower fresh water supply, the quantity of water to be heated is lower, with the result that energy can be saved.

In this case, the invention is based, inter alia, on the knowledge that, in conventional dishwashers, the washing and final rinse cycles of which proceed according to a program which is preset at the factory, overtreatment of the washware often takes place. It is frequently sufficient for an adequate washing and rinsing result simply to have, for example, a shorter cycle duration of the washing phase, a smaller quantity of washing liquid which is sprayed per unit time during the washing phase, a lower nozzle pressure with which the washing liquid is sprayed during the washing phase, a smaller quantity of final rinse liquid which is sprayed overall during the fresh water final rinse phase, and/or a lower temperature of the liquid (washing liquid, final rinse liquid) to be sprayed during the washing phase and fresh water final rinse phase.

According to the invention, the program control device 50 is accordingly designed in such a way that said program control device automatically actuates the washing pump 8 as a function of the detected type of washware in such a way that at least one of the parameters given below is adapted to the detected type of washware for the washing phase:

the cycle duration of the washing phase; the quantity of washing liquid sprayed per unit time during the washing phase; and
the pressure with which the washing liquid is sprayed during the washing phase.

Figure 2:
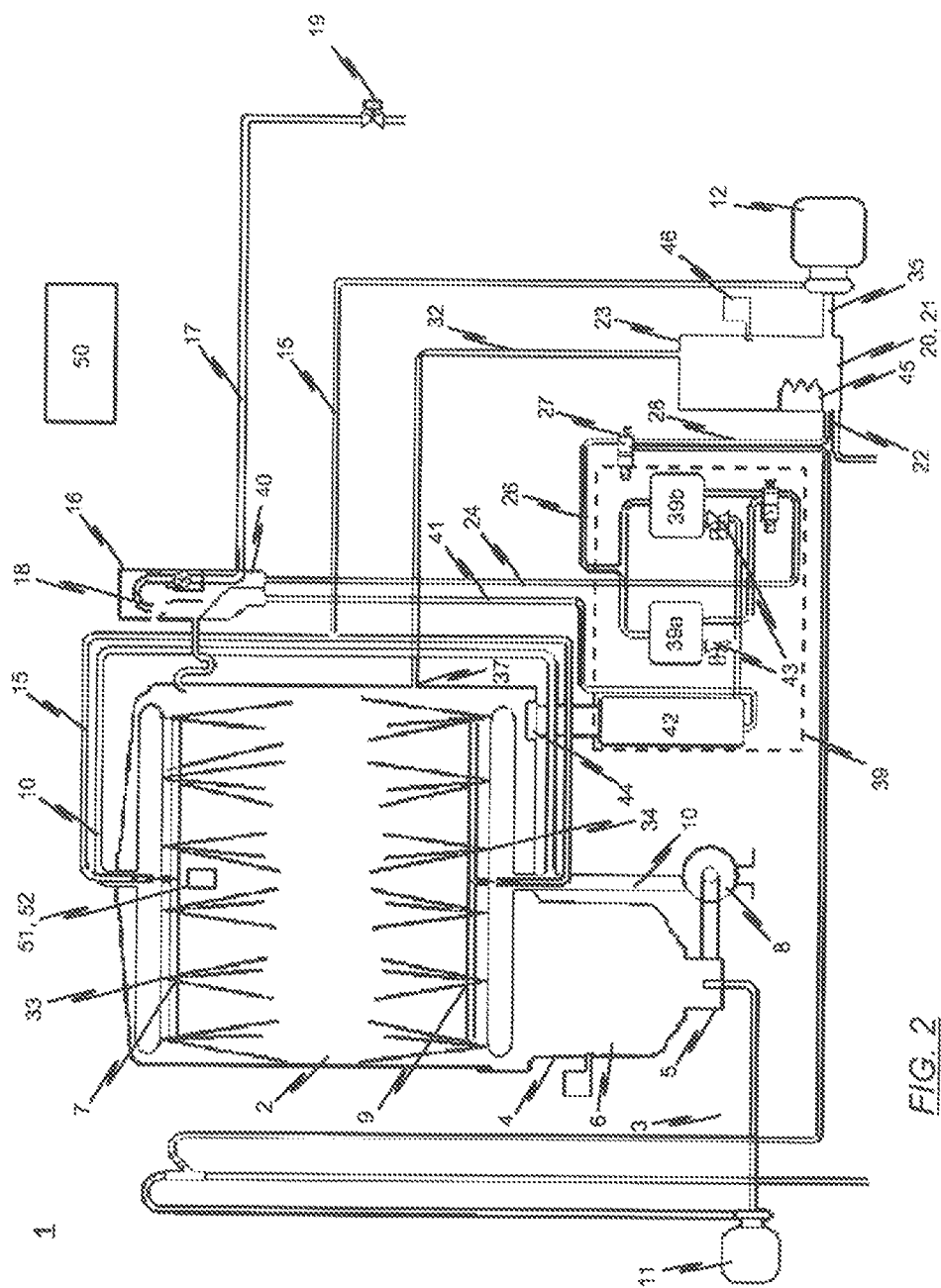
FIG. 2 schematically shows a dishwasher, which is designed in the form of a box-type dishwasher, according to a second embodiment of the invention.

A dishwasher 1, in particular a commercial dishwasher, in the form of a box-type dishwasher according to the second preferred embodiment of the solution according to the invention is provided schematically in FIG. 2. In contrast to the first embodiment illustrated in FIG. 1, the dishwasher 1 illustrated in FIG. 2 does not have a fresh water container and therefore also does not have a second final rinse pump by means of which—as illustrated in FIG. 1—unheated final rinse liquid can be supplied to the final rinse nozzles by means of a final rinse line system. Otherwise, the dishwasher 1 illustrated in FIG. 2 is structurally and functionally identical to the dishwasher described above with reference to FIG. 1. It is, of course, conceivable that the heater control circuit (not explicitly illustrated) can correspondingly actuate the heater 45 of the boiler 21 or of the steam generator 20 in order to provide a greater or lesser amount of heated final rinse liquid.

The method according to the invention and, in particular, the automatic detection of the type of washware will be explained in more detail below using various examples with reference to the schematic illustrations of FIGS. 3 to 9.

Figure 3:
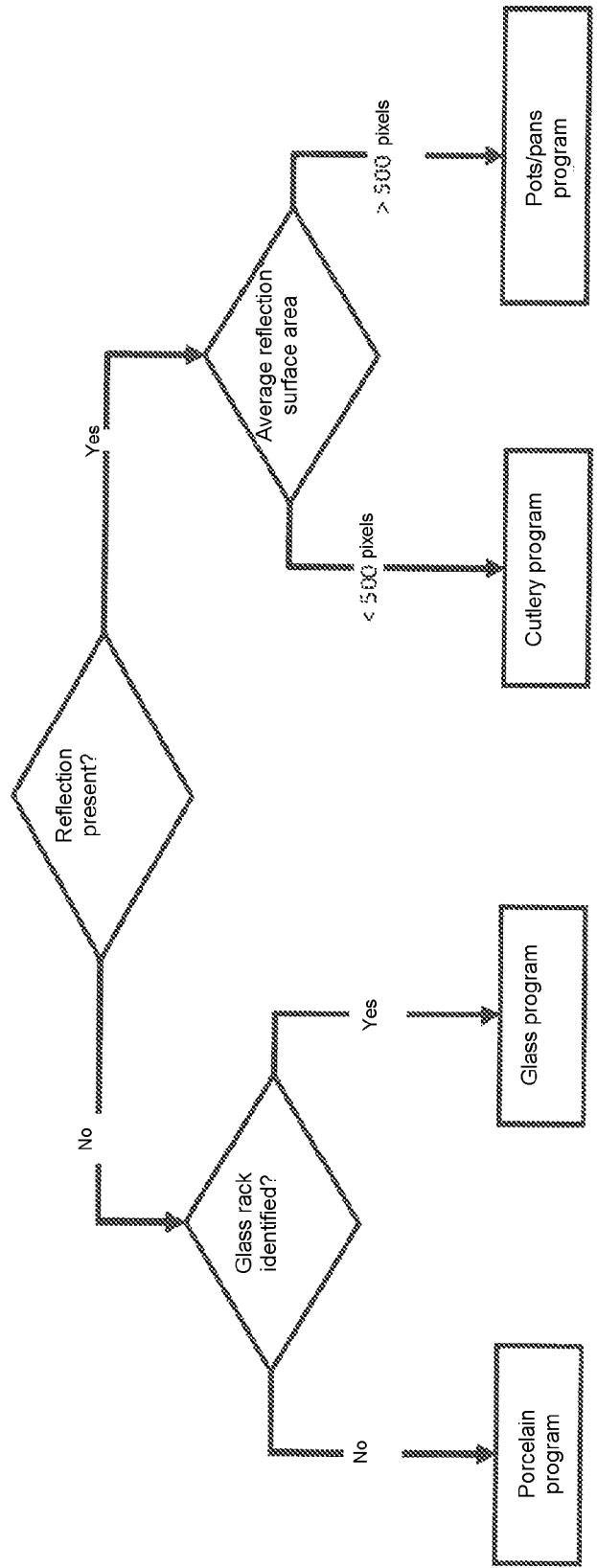
FIG. 3 schematically shows a flowchart for explaining an exemplary embodiment of the method according to the invention in which the reflection is used as a distinguishing criterion.

Specifically, FIG. 3 schematically shows a flowchart of a first exemplary embodiment of the method according to the invention for automatically detecting washware and classifying washware, wherein the reflection of light is used as a distinguishing criterion in this embodiment.

In the following explanations, the washware to be treated is subdivided into four different categories (types). These categories include "porcelain", "glasses", "cutlery" and "pots and pans". It goes without saying, however, that the present invention is not restricted to these four types of washware but these are types of washware which occur most often in commercial dishwashing. Said washware includes white porcelain and pots and pans made from stainless steel. Furthermore, it is assumed below that glasses are loaded only in the glass racks provided especially for them. This assumption is based on the conventional procedure in commercial dishwashing.

The objective of the concepts described below is automatic program selection, specifically depending on the type of washware to be treated. In the first concept, as is schematically shown with reference to the flowchart according to FIG. 3, the extent of the reflection provides information about the loaded washware.

In the first exemplary embodiment of the method according to the invention, a 2-dimensional image relating to the washware to be cleaned or to be classified is recorded and preferably digitized with the aid of an optical identification system for the purpose of detecting the type of washware to be treated. Patterns are then obtained from this data, which patterns serve to classify and/or detect the type of washware to be treated. The 2-dimensional image which is detected with the aid of the optical identification system is preferably a grayscale value image and further preferably a color image. The recorded image is possibly preprocessed and, in particular, filtered. The preprocessing can also comprise converting a previously recorded color image into a grayscale value image.

The subsequent evaluation of the recorded 2-dimensional image initially involves detecting whether there are corresponding reflections in the recorded 2-dimensional image. This is preferably performed by a corresponding grayscale value histogram being generated on the basis of the previously generated grayscale value image or the previously recorded grayscale value image. When corresponding reflections are then detected, washware is automatically categorized into the "cutlery" type of washware or into the "pots/pans" type of washware, specifically depending on the degree of the detected reflection and/or depending on the size of an average reflection surface area.

When, however, no corresponding reflections are detected, glass rack detection takes place in the method according to the first exemplary embodiment. When it is identified during the course of glass rack detection that a glass rack is present, washware is automatically categorized into the "glass" type of washware. When, however, a glass rack is not identified during the course of glass rack detection, washware is automatically categorized into the "porcelain" type of washware.

In other words, according to the first exemplary embodiment of the method according to the invention, which method is (at least partially) illustrated in the schematic flowchart according to FIG. 3, subdivision into two groups is initially performed: one group with reflections and one without reflections. The group with reflections includes cutlery and pots and pans. When no reflections can be measured, a distinction still has to be drawn between porcelain and glass. In the first exemplary embodiment of the method according to the invention, this distinction is drawn by means of the detection of the glass rack.

In the exemplary embodiment, the average surface area is measured in order to distinguish between cutlery and pots and pans. It is assumed here that these surface areas are significantly smaller in the case of cutlery than in the case of pots and pans. The reflection is measured by means of the associated grayscale value histogram. The idea here is that reflections on cutlery and pots and pans have a considerably higher peak in a predefined value range than white porcelain in the histogram. This value range preferably corresponds to a pure white in the grayscale value image.

Figure 4A:
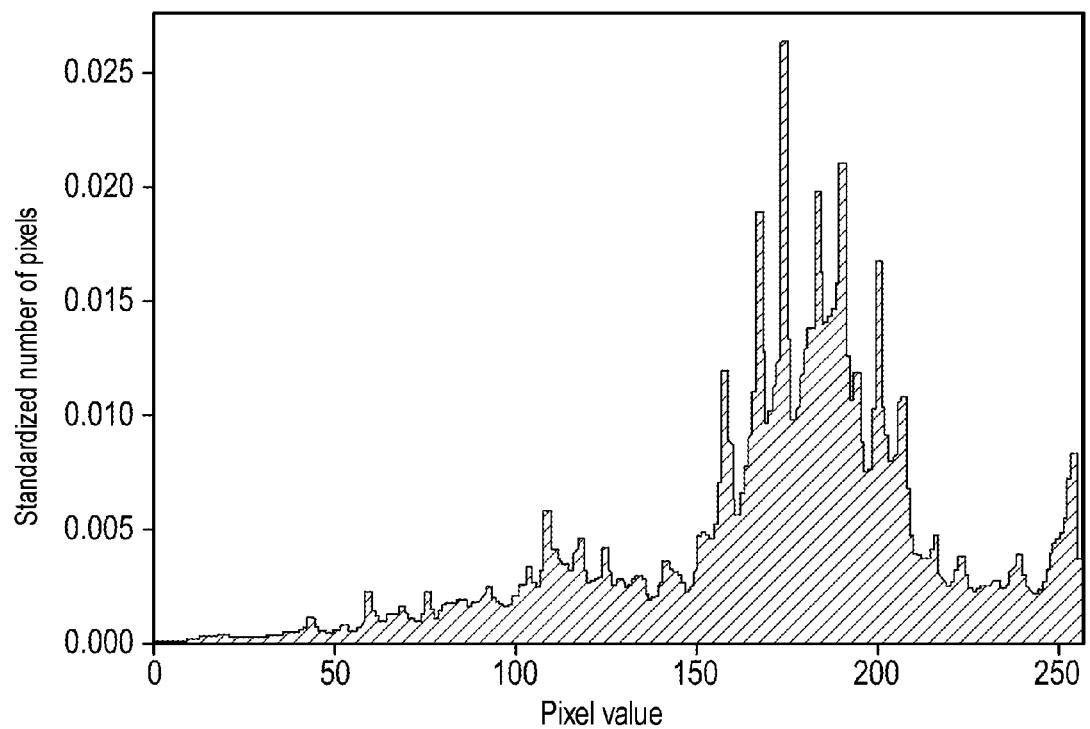
FIGS. 4A to 4D schematically show associated grayscale value histograms for measuring the reflection in different types of washware.
Figure 4B:
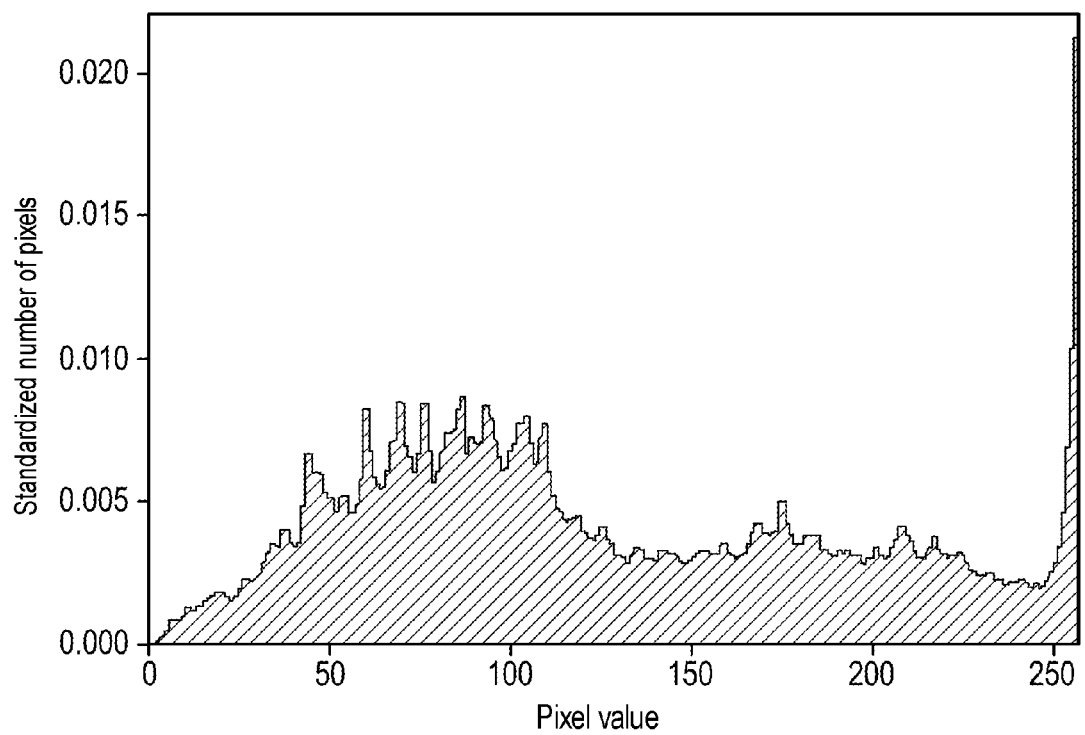
Figure 4C:
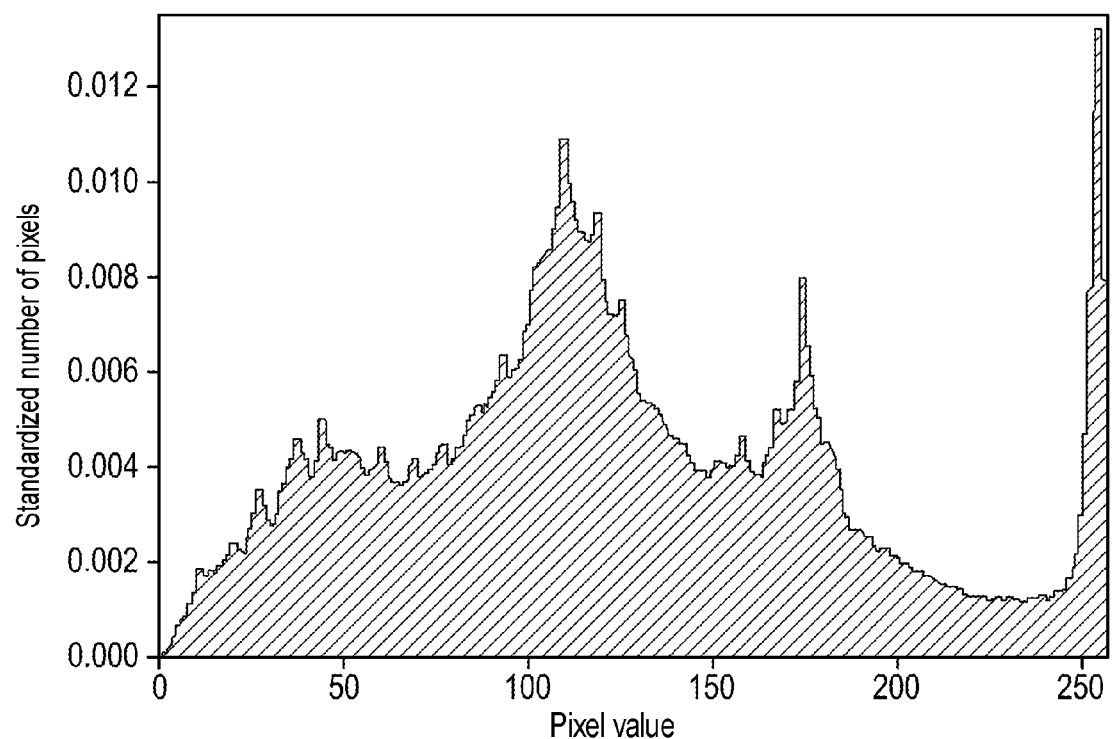
Figure 4D:
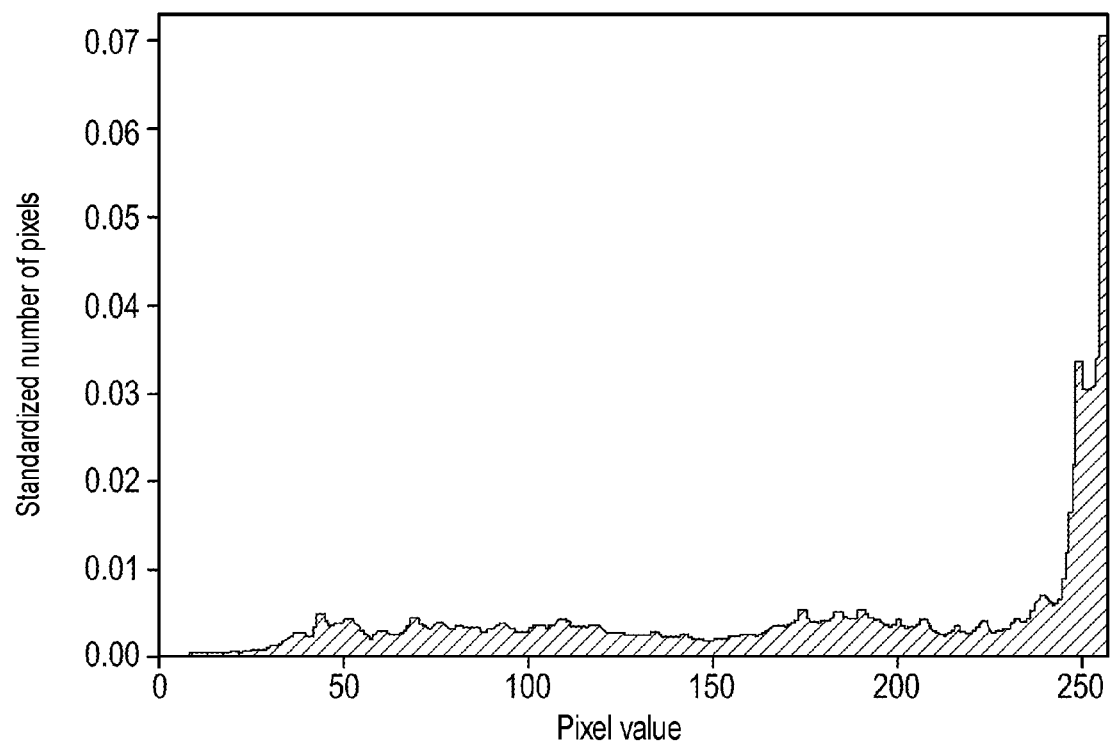

FIGS. 4A to 4D show the associated grayscale value histograms for different types of washware, specifically for porcelain plates (FIG. 4A), pots and pans (FIG. 4B), cutlery (FIG. 4C) and cups and bowls composed of porcelain (FIG. 4D).

In order to prevent accompanying influences of the stainless steel hood of the dishwasher or the stainless steel inner wall of the treatment chamber of the dishwasher in the histogram, only the region of the dish rack which is received in the treatment chamber should be taken into consideration for forming the histogram.

It is possible to identify on the basis of the exemplary grayscale value histograms according to FIG. 4A to FIG. 4D that there is an increased occurrence in the pixel value range of between 240 to 255, specifically in the case of loading with stainless steel (cf. FIG. 4B and FIG. 4C), this being used for differentiation purposes.

In order to optimize detection about the extent of the reflection, it is possible to perform classification by means of the object shape and object size. To this end, the following criteria are preferably defined: firstly the surface area, in pixels, of an object found. Furthermore, the roundness of the object is also recorded as a criterion. This is established by way of the smallest possible circle being drawn around the object found and a check then being made in respect of how much is covered by the object surface. The same is then once again additionally calculated using the smallest encompassing rectangle. These give the following three properties in respect of the shape and size of the objects: object surface area, roundness (=circular surface area of the smallest enclosing circle/object surface area), and rectangularity (=rectangular surface area of the smallest enclosing rectangle/object surface area).

Figure 5:
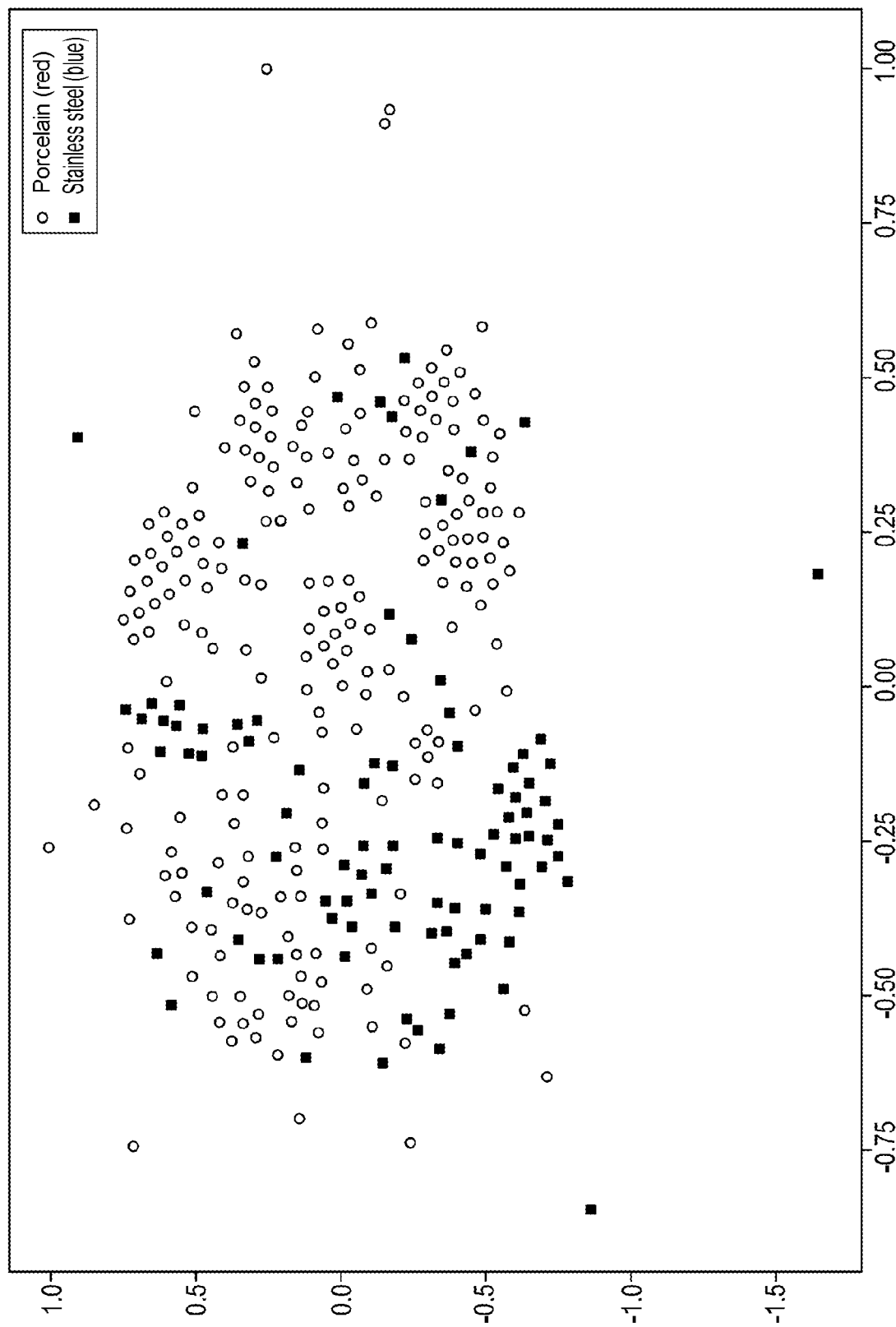
FIG. 5 schematically shows a two-dimensional feature space for color identification according to an exemplary embodiment of the method according to the invention.

FIG. 5 shows, by way of example, a feature space for color identification.

A second exemplary embodiment of the method according to the invention for automatically detecting and classifying washware is described below with reference to the schematic flowchart according to FIG. 6.

For the purpose of automatically detecting/classification washware, a 2-dimensional image, in particular a grayscale value image and preferably a color image, is first recorded with the aid of an optical identification system. The recorded image is then possibly preprocessed, wherein the preprocessing comprises, in particular, filtering. Subsequently, edge detection takes place on the preferably preprocessed image for the purpose of object detection.

Locations in an image at which the intensity values increase sharply along a specific direction in a small space are called edges in image processing. In the present case, the so-called canny operator is preferably used for edge detection. The canny operator attempts not only to detect edges as reliably as possible but at the same time to precisely determine the position of the edges. Furthermore, said canny operator attempts to minimize the number of incorrect edge detections. To this end, smoothing of the image using a Gaussian filter takes place in the first processing step. This is carried out in order to reduce noise in the original image.

Once the edge strength and edge direction have been determined for each pixel in the image, a check is once again made as to whether the edge is actually an edge. To this end, a check is made with the aid of the second derivative as to whether the pixel is at a local maximum along its edge direction.

Finally, the canny operator attempts to join all remaining pixels to form a contour. This is preferably performed with the aid of a threshold operation in which a check is made as to whether the edge strength lies between a lower and an upper limit value. If the edge strength lies above the limit value, the pixel is accepted as an edge. If the gradient is between the upper and the lower value, the pixel is recognized only as an edge if it adjoins a pixel with a value above the limit value. If the edge strength lies below the limit value, it is rejected.

Figure 6:
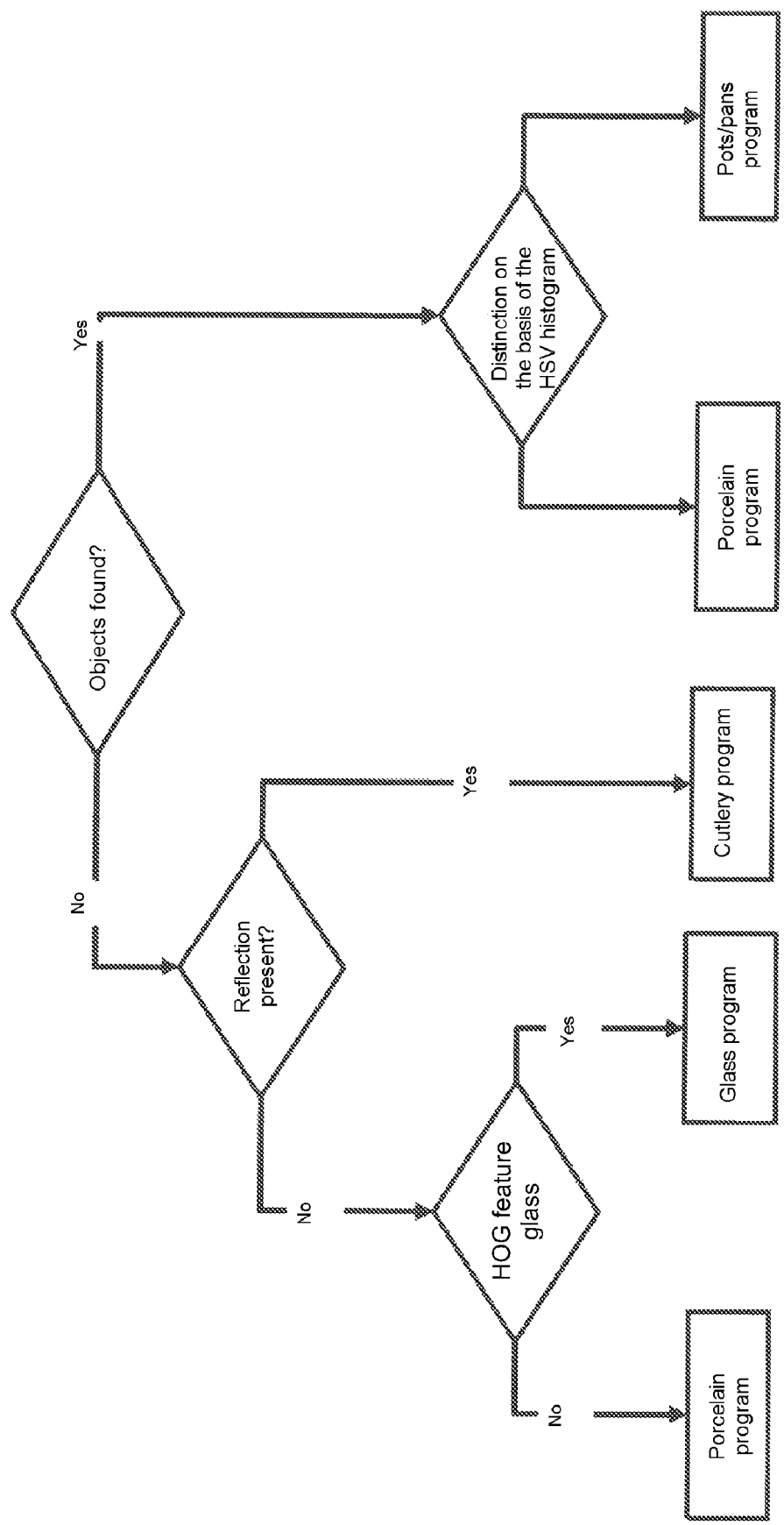
FIG. 6 schematically shows a flowchart according to an exemplary embodiment of the method according to the invention.

Once the edge detection has taken place in the method according to the flowchart in FIG. 6 for the purpose of object detection, a color histogram, in particular an HSV histogram, is formed for each object detected in the color image recorded by the optical identification system, and washware is correspondingly categorized into types of washware, in particular into the "porcelain" type of washware and into the "pots/pans" type of washware, on the basis of said histogram.

When, however, an object has not been detected during the course of object detection, detection is performed as to whether there are reflections in the recorded 2-dimensional image.

In order to be able to detect reflections, a corresponding grayscale value histogram is preferably generated on the basis of a previously stored grayscale value image. When it is detected that there are corresponding reflections in the recorded 2-dimensional image, washware is automatically categorized into the "cutlery" type of washware.

When, however, no corresponding reflections are detected, an HOG method is adopted and HOG feature vectors for the "glass" type of washware are determined. If corresponding HOG feature vectors for the "glass" type of washware can be determined, washware is automatically categorized into the "glass" type of washware.

When, however, no corresponding HOG feature vectors for the "glass" type of washware can be determined, washware is categorized into the "porcelain" type of washware.

The flowchart according to FIG. 6 can be briefly summarized as follows:

At the start, the image which is recorded with the aid of the optical identification system and preferably stored on a computer has to be read into a corresponding evaluation device. After it has been read in, the image is ready for processing as a multidimensional array. This array describes the image height, the image width and also the number of color channels. Due to the fact that edge detection which is to be carried out later expects a grayscale value image as an input for object detection, the color image is additionally stored as a grayscale value image. Filtering of the grayscale value image constitutes a further step in the preprocessing. A Gaussian filter is preferably used for said filtering. This operating step is mainly necessary in the case of pots and pans composed of stainless steel. Said pots and pans have thick structures on the surface owing to their material and owing to the reflection. These structures can be considered to be undesired high-frequency interference. These can be reduced by filtering using a low-pass filter, such as a Gaussian filter.

Edge detection takes place after filtering. The abovementioned canny edge detector is adopted for this purpose. The minimum and maximum values for the threshold value function are passed on as parameters. It has been found that the best results are achieved with a minimum threshold value of 0 and a maximum threshold value of 100.

In the binary image which is produced as a result of the edge detection, the relevant objects then have to be segmented for evaluation. To this end, the contours are found. Contours are understood to be all points along a boundary with the same color or intensity. When applied to a binary image, the white regions are understood to be objects and the black regions are understood to be background. In order to segment the relevant objects, the binary image is inverted in a first step. This step is necessary so that the object surface area is displayed as white objects and the background is displayed as a black area. In a next step, the background is separated from the desired object with the aid of morphological operations. To this end, all objects are reduced in size by applying erosion. Owing to suitable selection of the structural element, it is possible, as a result, to reduce the size of the non-relevant surface areas to such an extent that they are deleted from the image. The remaining elements are then increased back to their original size by way of dilation.

In a next step, the features have to be extracted from the detected objects. In this concept, the color is first used as a property. Owing to the preceding object detection, a mask can be created for each object found. With the aid of this mask, it is possible to record the histogram only for the object found. A mask is understood to be a binary image which contains only the object found.

In this context, it is advantageous when the RGB image, which has been recorded by the camera of the optical recording system, is further converted into an HSV image beforehand.

Figures 7A, 7B:
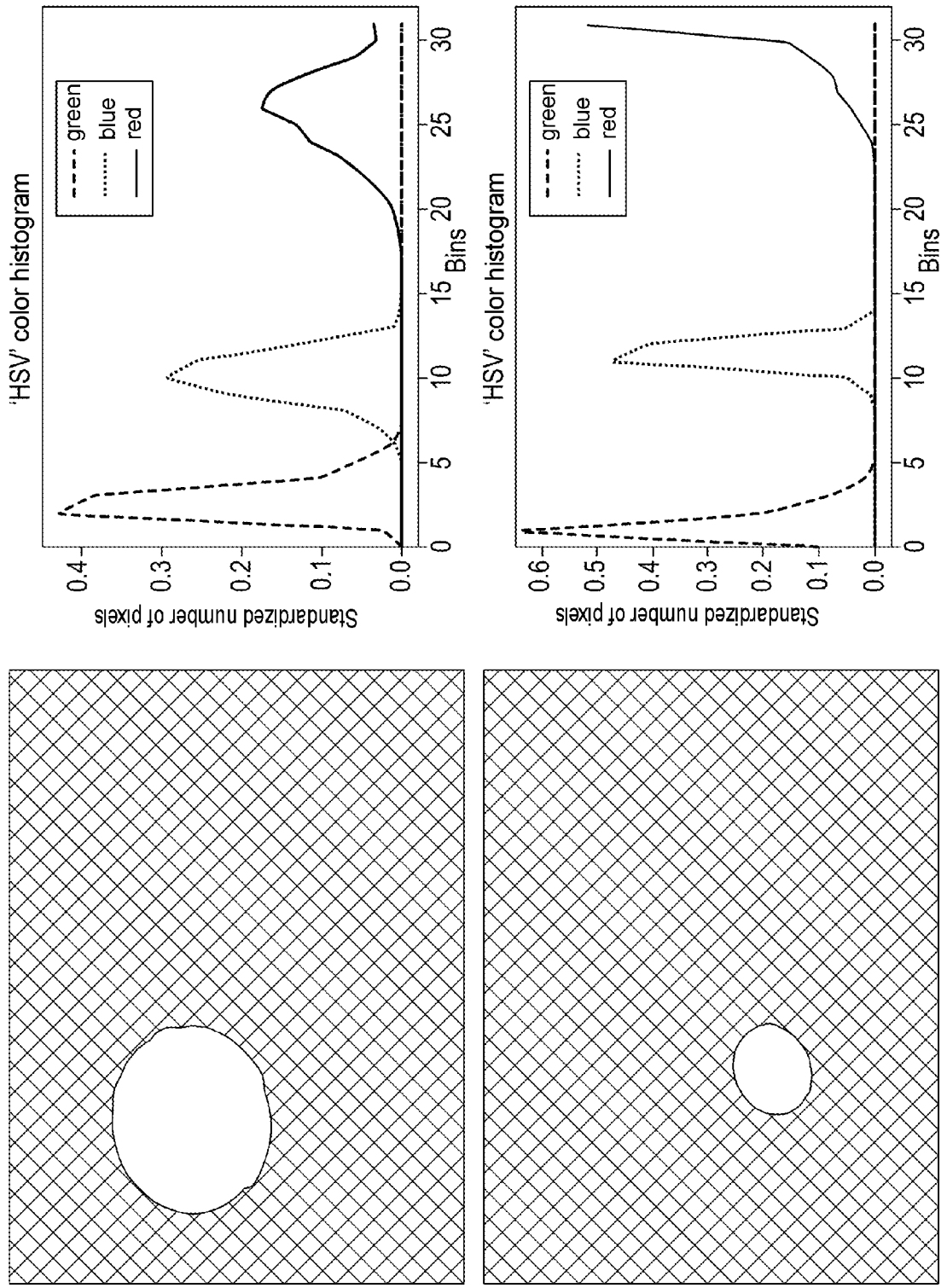
FIGS. 7A and 7B schematically show a HSV histogram for different types of washware.

FIGS. 7A and 7B illustrate, by way of example, two binary masks with corresponding histograms. FIG. 7A relates to a pot, and FIG. 7B relates to a cup. In the histogram, the color "blue" represents the H value, the color "green" represents the S value and the color "red" represents the V value of the HSV color space. The histograms shown in FIGS. 7A and 7B are limited to 32 bins and normalized. Normalization of the histogram ascertained is important in order to be able to compare objects with different surface areas with one another.

After extraction of the properties, the object classification is divided into a training phase and a test phase.

In the same way as a human, the computer naturally cannot classify any objects which it does not identify. For this reason, a training phase has to take place. During this phase, the human has to provide the computer with information as to which class the recorded object properties belong to.

During the test phase, classification of the unknown object is carried out on the basis of the learnt properties from the training phase.

Figure 8:
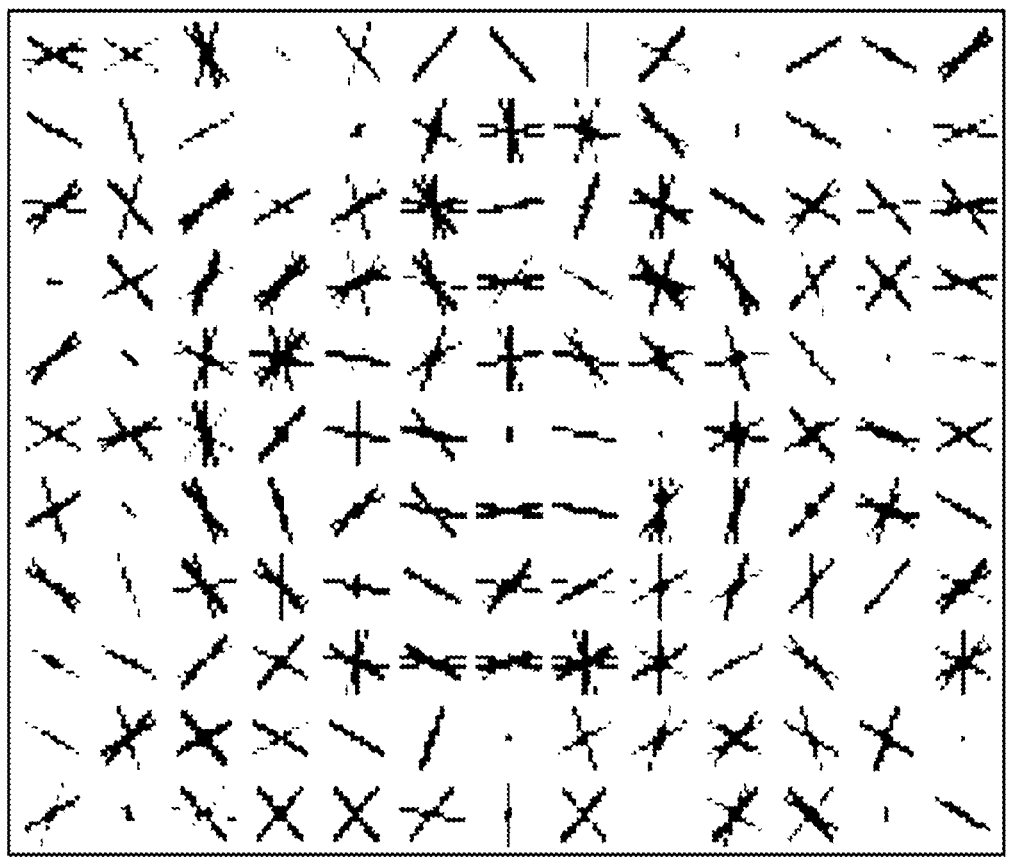
FIG. 8 schematically shows a visual representation of HOG features for a glass according to an exemplary embodiment of the method according to the invention.

In the case of object detection with a rack loaded with glasses, no objects are found. However, due to the program status, only loading with glasses or an empty rack can be present at this point. In order to distinguish between these situations, glasses are sought with the aid of an HOG method (HOG=Histogram of Oriented Gradient). FIG. 8 shows a visual representation of the HOG features for a glass.

Figure 9:
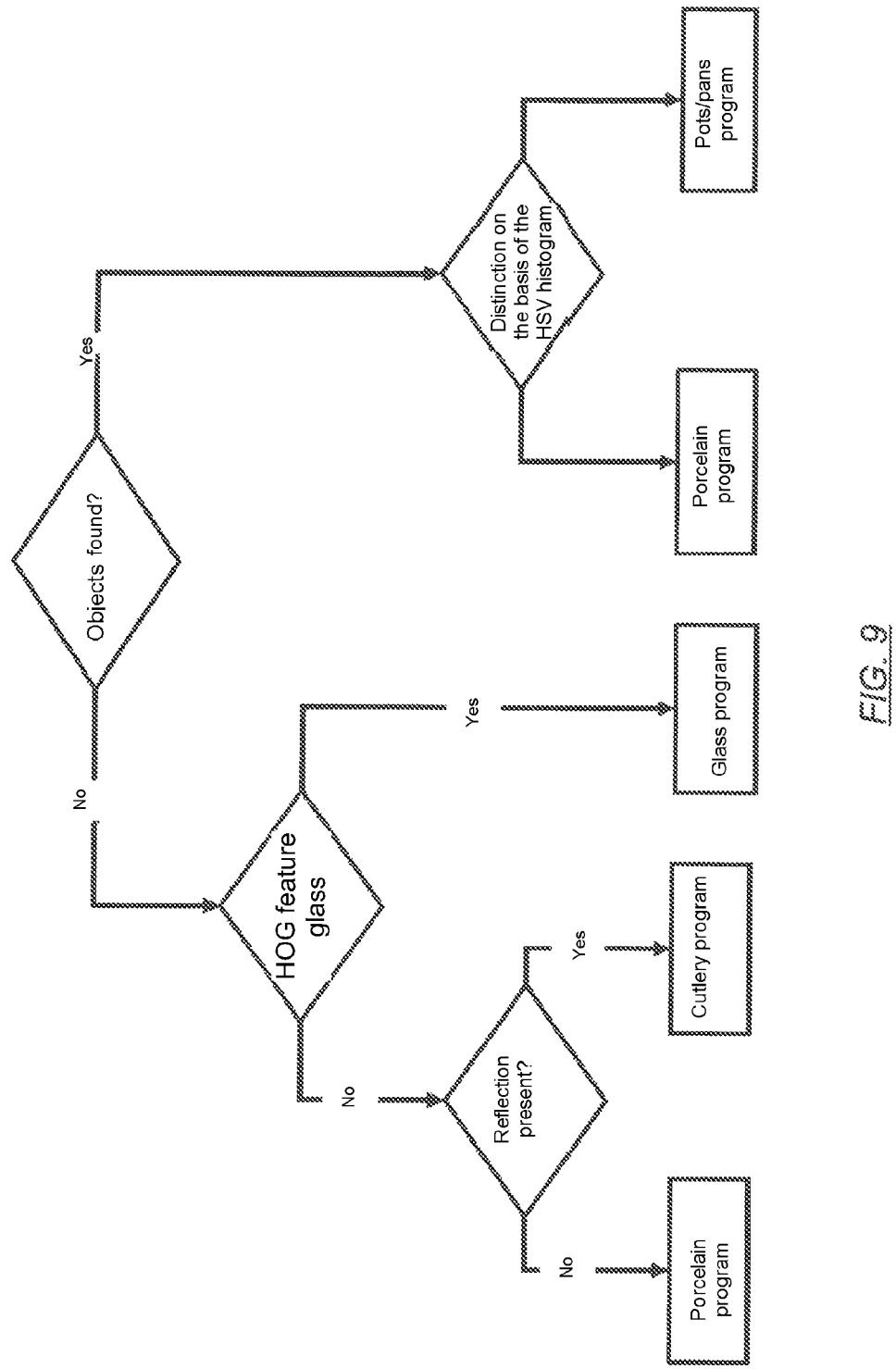
FIG. 9 schematically shows a flowchart according to an exemplary embodiment of the method according to the invention.

FIG. 9 schematically shows a flowchart of a further method according to the invention. This method corresponds substantially to the method described above with reference to the flowchart according to FIG. 6, wherein, however, a HOG method is adopted when no object is detected, in order to determine HOG feature vectors and to allow categorization into the "glass" type of washware. When, however, no corresponding HOG feature vectors for this type of washware can be determined, reflection detection is used to determine whether categorization into the "cutlery" type of washware or into the "porcelain" type of washware is to be performed.

The invention is not restricted to the exemplary embodiments but is the result of looking at all of the features disclosed in this document together. Rather, the invention is the result of overall consideration of the patent claims and of the description of the exemplary embodiments by a person skilled in the art.

In particular, it is conceivable that the dishwasher 1 has, furthermore, a detergent metering device for adding detergent in a metered manner to the washing liquid. The program control device 50 should in this case particularly preferably be designed to adjust the quantity of detergent added to the washing liquid in a metered manner depending on the type of washware to be treated. In particular, it is conceivable that an increased quantity of detergent is added in a metered manner when a type of washware which is associated with the second washware group is detected, while a standard value is selected for the quantity of detergent which is added in a metered manner in the case of the other washware groups.

As an alternative or in addition, it is further conceivable that the dishwasher 1 has a rinse aid metering device for adding rinse aid in a metered manner to the final rinse liquid, wherein the program control device 50 is preferably designed to adjust the quantity of rinse aid which is added in a metered manner depending on the type of washware to be treated. In this case it is, in particular, conceivable that, when washware which is associated with the first group of washware is detected, the quantity of rinse aid which is added in a metered manner is automatically reduced in comparison to the other washware groups.

The invention claimed is:

1. A method for cleaning washware in a box-type dishwasher that has a treatment chamber which can be closed and in which washware can be treated in accordance with a predefined or predefinable treatment program, wherein the method comprises the following method steps:

i) a type of washware to be treated in the treatment chamber is automatically detected;
ii) a predefined or predefinable treatment program for treating the washware is automatically selected depending on the type of washware detected; and
iii) the process parameters associated with the selected treatment program are automatically adjusted, wherein, in method step i), data in the form of a 2-dimensional image, relating to the washware to be treated is recorded and digitized with the aid of an optical identification system, and patterns are obtained from the data, which patterns serve to classify and/or detect the type of washware to be treated, wherein a reflection of light on the washware to be treated is used as at least one measure for detecting the type of washware to be treated;

wherein the data recorded in method step i) is a 2-dimensional color image, and wherein the color is used as a criterion for classifying and detecting the washware to be treated;

wherein method step i) comprises the following substeps:
a) the recorded 2-dimensional color image is preprocessed; and
b2) edge detection takes place on the preprocessed image for the purpose of object detection, wherein the preprocessing in method substep a) comprises filtering;

wherein the recorded 2-dimensional color image is additionally stored as a grayscale value image in method substep a), and wherein, when at least one object is detected in method substep b2), method step i) further comprises the following substep:
c) a HSV ("hue, saturation, value") histogram is formed for each object detected in the color image, and washware is categorized into types of washware, including into a porcelain type of washware and into a pots/pans type of washware, on the basis of said HSV histogram;

wherein, when no object is detected in method substep b2), method step i) further comprises the following substep:
d1) detecting whether there are reflections in the recorded 2-dimensional color image by a corresponding grayscale value histogram being generated on the basis of the stored grayscale value image, wherein, when corresponding reflections are detected in method substep d1), washware is categorized into a cutlery type of washware;

wherein, when no corresponding reflections are detected in method substep d1), method step i) further comprises the following substep:
e1) adopting an HOG ("histogram of oriented gradient") method and determining HOG feature vectors for categorizing washware into a glass type of washware if corresponding HOG feature vectors can be determined.

2. The method as claimed in claim 1,
wherein, when no corresponding HOG feature vectors for categorizing washware into the glass type of washware can be determined in method substep e1), washware is categorized into a porcelain type of washware.

3. The method of claim 1, wherein
a washware detector apparatus is positioned and configured to automatically detect the type of washware to be treated in the treatment chamber, wherein the washware detector apparatus has the optical identification system, which is oriented toward the washware to be treated in the treatment chamber, and an evaluation device, wherein the steps of claim 1 are carried out by the washware detector apparatus.

4. The method of claim 3, wherein the optical identification system has a camera which is arranged within the treatment chamber in or in the vicinity of an upper end region on a rear wall or a front wall of the treatment chamber, and wherein the optical identification system further has a lighting system with at least one light source which is designed to allow homogeneous and diffuse illumination of at least a portion of the washware to be treated with light at a color temperature of between 5200 and 5700 K.

5. A method for cleaning washware in a box-type dishwasher that has a treatment chamber which can be closed and in which washware can be treated in accordance with a predefined or predefinable treatment program, wherein the method comprises the following method steps:
i) a type of washware to be treated in the treatment chamber is automatically detected;
ii) a predefined or predefinable treatment program for treating the washware is automatically selected depending on the type of washware detected; and
iii) the process parameters associated with the selected treatment program are automatically adjusted, wherein, in method step i), data in the form of a 2-dimensional image, relating to the washware to be treated is recorded and digitized with the aid of an optical identification system, and patterns are obtained from the data, which patterns serve to classify and/or detect the type of washware to be treated, wherein a reflection of light on the washware to be treated is used as at least one measure for detecting the type of washware to be treated;

wherein the data recorded in method step i) is a 2-dimensional color image, and wherein the color is used as a criterion for classifying and detecting the washware to be treated;

wherein method step i) comprises the following substeps:
a) the 2-dimensional color image is preprocessed, wherein the preprocessing comprises filtering and/or converting the 2-dimensional color image into a grayscale value image, wherein method step i) further comprises the following substep:
b1) detecting whether there are reflections in the recorded 2-dimensional color image by generating a corresponding grayscale value histogram on the basis of the grayscale value image, wherein, when corresponding reflections are detected in method step b1), washware is categorized into a cutlery type of washware or into a pots/pans type of washware depending on a degree of the detected reflection and/or the size of a detected, average reflection surface area.

6. The method as claimed in claim 5,
wherein, when no corresponding reflections are detected in method step b1), glass rack detection takes place, and, wherein, when it is identified during the course of glass rack detection that a glass rack is present, washware is categorized into a glass type of washware, wherein, however, when a glass rack is not identified during the course of glass rack detection, washware is categorized into a porcelain type of washware.

7. A method for cleaning washware in a box-type dishwasher that has a treatment chamber which can be closed and in which washware can be treated in accordance with a predefined or predefinable treatment program, wherein the method comprises the following method steps:

i) a type of washware to be treated in the treatment chamber is automatically detected;
ii) a predefined or predefinable treatment program for treating the washware is automatically selected depending on the type of washware detected; and
iii) the process parameters associated with the selected treatment program are automatically adjusted, wherein, in method step i), data in the form of a 2-dimensional image, relating to the washware to be treated is recorded and digitized with the aid of an optical identification system, and patterns are obtained from the data, which patterns serve to classify and/or detect the type of washware to be treated, wherein a reflection of light on the washware to be treated is used as at least one measure for detecting the type of washware to be treated;

wherein the data recorded in method step i) is a 2-dimensional color image, and wherein the color is used as a criterion for classifying and detecting the washware to be treated;

wherein method step i) comprises the following substeps:
a) the recorded 2-dimensional color image is preprocessed; and
b) edge detection takes place on the preprocessed image for the purpose of object detection, wherein the preprocessing in method substep a) comprises filtering;

wherein, when no object is detected in method substep b), method step i) further comprises the following substep:
c) adopting an HOG ("histogram of oriented gradient") method and determining HOG feature vectors for categorizing washware into a glass type of washware if corresponding HOG feature vectors can be determined.

8. The method as claimed in claim 7, wherein, when no corresponding HOG feature vectors for categorizing washware into the glass type of washware can be determined in method substep c), washware is categorized into a porcelain type of washware.

9. The method as claimed in claim 7, wherein, when no corresponding HOG feature vectors for categorizing washware into the glass type of washware can be determined in method substep c), method step i) further comprises the following substep:
d) detecting whether there are reflections in the recorded 2-dimensional color image by a corresponding grayscale value histogram being generated on the basis of the grayscale value image, and wherein, when corresponding reflections are detected in method substep d), washware is categorized into a cutlery type of washware, but wherein, when no corresponding reflections are detected in method substep d), washware is categorized into a porcelain type of washware.

* * * * *